United States Patent Office 2,733,978
Patented Feb. 7, 1956

2,733,978

SOLUTIONS OF ACRYLONITRILE POLYMERS IN MIXTURES OF PROPYLENE CARBONATE AND WATER

Evan Islwyn Jones and Stanley Minor Todd, Blackley, England, assignors to Imperial Chemical Industries Limited, London, England, a corporation of Great Britain No Drawing. Application July 30, 1954,
Serial No. 446,950

Claims priority, application Great Britain August 24, 1953

9 Claims. (Cl. 18—54)

This invention relates to new and improved compositions comprising acrylonitrile and grafted acrylonitrile polymers, and to an improved process for spinning filaments and yarns from these compositions.

By the term "acrylonitrile polymer" we include polyacrylonitrile, copolymers and interpolymers of acrylonitrile and other vinyl compounds containing a major proportion of acrylonitrile in the polymer molecule. Acrylonitrile polymers can be spun into fibres and for the manufacture of such fibres it is preferred that the acrylonitrile polymer should contain at least 80% acrylonitrile in the polymer molecule.

By the term "grafter acrylonitrile polymer" we mean a polymer obtained by polymerising acrylonitrile alone or in the presence of a minor amount of one or more other monomeric vinyl compounds, in the presence of one or more other polymeric substances. The free radicals formed during the polymerisation process react with the polymeric substance and this brings about a chemical combination of the newly formed polymer and the polymeric substance already present. Grafted acrylonitrile polymers cannot be separated into their constituent parts by physical methods, because the two or more polymeric materials are chemically combined.

Grafted acrylonitrile polymers can be spun into fibres which, while retaining the good properties ascribed to fibres obtained from acrylonitrile polymers, have the great advantage of enhanced dye receptivity. For use in the making of fibres, those grafted acrylonitrile polymers obtained by polymerising at least 85 parts by weight of acrylonitrile with not more than 15 parts by weight of any other monomeric vinyl compound or compounds are preferred. It is also preferred that the polymeric substance should be water soluble, have a molecular weight greater than 1000, and that the amount present should be between 5 and 40% by weight of the grafted acrylonitrile polymer.

It is known that propylene carbonate can be used as a solvent for acrylonitrile polymers. We have now found that acrylonitrile and grafted acrylonitrile polymers can be dissolved in a mixture of propylene carbonate and water, such new compositions showing improvements over those containing propylene carbonate.

Thus, according to the present invention we provide new and improved compositions comprising an acrylonitrile polymer or a grafted acrylonitrile polymer, propylene carbonate and water, wherein the weight of the propylene carbonate is greater than that of the water.

The present invention also comprises the production of shaped articles from such compositions.

To obtain solutions having a polymer concentration sufficiently high for spinning into fibres or casting into films we prefer that the propylene carbonate is present to an extent greater than 60% by weight of the propylene carbonate/water mixture.

In the spinning of fibres from the compositions of this invention usual coagulative spinning processes are used.

The coagulating bath may comprise any suitable liquid such as an aliphatic dihydric alcohol or a metal salt solution, but water is prefered because of its availability, cheapness and the excellent fibres obtained. It will be appreciated that as spinning proceeds propylene carbonate will collect in the bath, and after a time, particularly if the bath is heated, a little propylene glycol will be present as a result of decomposition of the propylene carbonate. It is preferred that the total propylene carbonate content should be kept substantially constant in the bath, although a concentration gradient may exist along the bath.

According to a further feature of our invention we provide an improved process for the spinning of filaments or yarns from an acrylonitrile polymer or a grafted acrylonitrile polymer which comprises extruding a solution of the polymer in a mixture of propylene carbonate and water, into an aqueous coagulating bath and recovering at least some of the propylene carbonate which accumulates in the coagulating bath, by a cooling process which causes the propylene carbonate to separate out.

In the preferred method of our invention we cool the propylene carbonate aqueous solution to 0° C. When propylene carbonate separates as a bottom layer and is drained off.

In another method of our invention we cool the solution of propylene carbonate and water to at least 25° C. when benzene, for example, is added to assist the separation and at least some of the propylene carbonate is extracted as an upper layer.

If benzene is used to extract the propylene carbonate, distillation of the propylene carbonate/benzene layer is necessary with filtration of the distillate e. g. through activated carbon, otherwise no drying or other purification of the propylene carbonate is necessary for its immediate re-use in the preparation of further spinning solution. The water concentration of the solution can be adjusted without difficulty prior to spinning to give uniform operating conditions.

The present invention also comprises a continuous process for the spinning of fibres from acrylonitrile or grafted acrylonitrile polymers wherein a solution of the polymer in a mixture of propylene carbonate and water is extruded through a spinneret into an aqueous coagulating bath, cooling a portion of said bath so that at least some of the propylene carbonate separates out, recovering said propylene carbonate and using it to form more spinning solution, and, if desired, returning the supernatant liquor to the coagulating bath.

The following examples in which all parts are by weight, illustrate but do not limit the scope of our invention.

*Example 1*

(a) To 20 parts of propylene carbonate at 20° C., while stirring, were added slowly 2.2 parts of polyacrylonitrile, in finely powdered form. After complete addition of the polymer the slurry was heated to 160° C. While still stirring, the solution formed in this manner was maintained at 160° C. for 20 minutes. It was then cooled to 125° C. and its viscosity at this temperature, as measured by the falling-sphere method, was 125 poises. It was cooled further to 100° C. but separation of polymer resulted.

(b) 18 parts of propylene carbonate were mixed with 3 parts of water at 50° C. and 2.3 parts of the above polyacrylonitrile were added slowly with vigorous stirring. After the addition, the slurry was heated to 98°–100° C. and maintained at this temperature for half an hour while still stirring. The resulting clear solution had a falling-sphere viscosity of 96 poises at 100° C. This gave a 10% solution of polyacrylonitrile in 84/14 propylene carbonate/water suitable for spinning into fibres. It could be cooled to 75° C. before polymer separation occurred.

(c) 16 parts of propylene carbonate were mixed with 4 parts of water at 20° C. and heated to 50° C. 2.2 parts of the above polyacrylonitrile were added slowly while vigorously stirring to form a slurry. After the addition was completed the slurry was heated to 98°–100° C. and maintained at this temperature for half-an-hour while still stirring. The resulting clear solution had a falling-sphere viscosity of 54 poises at 100° C. and a precipitation temperature of 85° C. A solution suitable for spinning into fibres was obtained containing 10% of polyacrylonitrile in an 80/20 mixture of propylene carbonate and water.

*Example 2*

(a) 2.2 parts of a finely powdered copolymer consisting of 93/7 acrylonitrile/2-vinyl pyridine were added slowly to 20 parts of propylene carbonate at room temperature while stirring vigorously. After the addition was completed, the slurry was heated to 125° C. and the resulting clear solution was maintained at this temperature for half-an-hour. The viscosity was 7.5 poises at 125° C. and 12 poises at 100° C. It did not precipitate above 30° C. This solution was suitable for spinning into fibres and consisted of a 10% solution of acrylonitrile/vinyl pyridine copolymer in 100% propylene carbonate.

(b) 16 parts of propylene carbonate were mixed with 4 parts of water at 20° C. and heated to 50° C. 2.2 parts of the above copolymer were slowly added with vigorous stirring to form a slurry. The slurry was stirred for half-an-hour and then heated to 98°–100° C. The resulting solution was stirred for half-an-hour at 98°–100° C. and had a falling-sphere viscosity of 9 poises at 100° C. and a precipitation temperature of 85° C. This 10% solution of acrylonitrile/vinyl pyridine copolymer in an 80/20 mixture of propylene carbonate and water was suitable for spinning into fibres.

*Example 3*

A 12% solution of the same acrylonitrile/vinyl pyridine copolymer used in Example 2 was prepared in an 80/20 mixture of propylene carbonate/water by slowly adding 51 parts of the dry, finely powdered copolymer to a vigorously stirred mixture of 300 parts propylene carbonate and 75 parts water at 65° C. and heating to about 105° C. This temperature was maintained for half-an-hour while stirring to disperse any gel particles present. The solution was transferred to a spinning machine hopper at 85°–90° C. and extruded by means of a viscose-type metering pump through a filter and a 40/0.100 mm. viscose-type platinum alloy spinneret at 25 gm./min., the temperature of the solution near the point of exit being about 105° C. The spinneret was immersed in a bath containing initially, water at 80° C. and the coagulated filaments were allowed to travel 7 feet in the bath liquor. They were led from the bath under a guide onto a capstan/separator roll system rotating at 70 feet/minute (stretch ratio 0.29) and wound on a friction-driven metal bobbin. The yarn was washed substantially solvent free in running hot water at 60° C. overnight and, after draining off the surplus water, it was drawn 5 times at 150° C. to yield a bright, lustrous and strong yarn suitable for use as a thread, e. g. for textile purposes.

*Example 4*

(a) 18 parts of propylene carbonate were stirred at 20° C. and 2 parts of finely powdered grafted polymer, consisting of 85 parts acrylonitrile grafted onto 15 parts of polyvinyl alcohol under polymerising conditions, were slowly added. The slurry was heated to 160° C. and gave a cloudy, heterogeneous solution containing undissolved polymer, unsuitable for spinning into fibres. If all the polymer had dissolved this would have given a 10% solution of polyvinyl alcohol grafted acrylonitrile polymer in 100% propylene carbonate.

(b) 16 parts of propylene carbonate were mixed with 6 parts of water at 20° C. and heated to 50° C. while stirring. 2.3 parts of a finely powdered grafted polymer consisting of 85 parts of acrylonitrile grafted onto 15 parts of polyvinyl alcohol under polymerising conditions were added slowly to the liquid mixture to form a slurry. The slurry was heated to 98° to 100° C. and the resulting solution maintained at this temperature for half-an-hour. It had a falling-sphere viscosity of 4.5 poises at 100° C. and a precipitating temperature of 75° C. The solution at 98–100° C. was clear and homogeneous. This 9.4% solution of polyvinyl alcohol grafted acrylonitrile polymer in a 73/27 mixture of propylene carbonate and water was suitable for spinning into fibres.

(c) 15 parts of propylene carbonate were mixed with 5 parts of water at 20° C. and the mixture heated to 50° C. 3 parts of the grafted polymer used in Example 1(b) were added slowly to the well-stirred liquid mixture, to form a slurry. The slurry was heated to 98°–100° C. and maintained at this temperature for half-an-hour. It had a falling-sphere viscosity of 16.5 poises at 100° C. and a precipitation temperature of 70° C. It was clear and homogeneous at 98°–100° C. This solution was suitable for spinning into fibres and consisted of an 11.4% solution of polyvinyl alcohol grafted acrylonitrile polymer in a 75/25 mixture of propylene carbonate and water.

*Example 5*

A 12.5% solution of a grafted polymer consisting of 85/15 acrylonitrile/polyvinyl alcohol was prepared by slowly adding 100 parts of dry, finely powdered polymer to a well-stirred mixture composed of 525 parts propylene carbonate and 175 parts water at 65° C. The slurry was then heated to 105° C. and maintained at this temperature for half-an-hour to disperse gel particles and obtain a more intimate mixture. The solution was transferred into a spinning machine hopper at 85°–90° C. and extruded by means of a viscose-type metering-pump through a filter and viscose-type, 40/0.100 mm. diameter, platinum alloy spinneret, the extrusion temperature being 105° C. The spinneret was immersed in a bath initially containing water at 90° C. and the filaments led through the bath liquor for a distance of 7 feet. They were then led under a guide at the end of the bath, wound on a capstan/separator roll system and collected on a friction-driven metal bobbin. The solution output rate was 15 gms./minute and the yarn wind-up speed was 70 feet/minute giving a stretch ratio of 0.5. The tension was negligible, no deliberate tension being imposed on the yarn. After washing substantially solvent-free overnight in running hot water at 60° C., and draining off the surplus water the yarn was dried continuously on a heated capstan/separator roll system at 140° C. rotating at a peripheral velocity of 15.7 feet/minute to yield bright yarn which was drawn 5 times from the take-off end of the capstan. The dried and drawn yarn had a denier of 145 and a tenacity of 2.4 gms./denier at 6.8% extension. It was bright, lustrous and light in colour being suitable for textile use.

*Example 6*

A mixture of propylene carbonate (50 gms.) and water (150 gms.) was heated to 45–50° C. to obtain complete miscibility on stirring. It was then cooled to 0° C. and allowed to settle in a separating funnel. The bottom layer was drained off and consisted of 20 gms. of propylene carbonate of 96% purity. This is equivalent to 19.2 gms. of 100% pure propylene carbonate, and represents a 38.4% recovery. The aqueous layer had an approximate propylene carbonate content of 18%.

Example 7

100 parts of a graft interpolymer containing acrylonitrile, vinyl acetate and polyvinyl alcohol in the proportions 84/8/8, in finely powdered form, were added slowly to a vigorously stirred mixture of 75/25 propylene carbonate/water, 900 parts at 65° C. After complete addition of the polymer the slurry was further stirred at 65° C. for 15 minutes. It was then heated to 100° C. and the so-formed clear solution was maintained at this temperature, while stirring, for two hours. The total weight of the solution was approximately 1000 gms. It was possible to cool this solution to 55° C. without precipitation of the polymer.

The solution was transferred to the hopper of a spinning machine which was maintained at a temperature of 85° C. Air-pressure was applied through the lid of the hopper and the solution was thereby transferred through a 200 mesh gauze into a steam-chased, viscose type metering-pump. The pump delivered the solution at the rate of 7.5 gm./minute through a cloth filter (steam-jacketed) to a 60/.075 mm. platinum alloy, viscose type spinneret. The spinneret face was coated with a smear of silicone grease, to prevent the solution spreading to from a blob, and the spinneret immersed in a bath containing 5% aqueous propylene carbonate at 80° C. The bath was 8 feet long and constructed of aluminum angle material, 1⅜" sides with a box for the spinneret at one end and inlet and outlet taps for bath liquor. The filaments which formed in the bath were allowed to travel 8 feet along the bath, being withdrawn underneath a guide over a capstan rotating at 25 feet/minute and collected on a friction-driven metal bobbin.

The yarn was white, opaque and of low tenacity. It was washed substantially free of solvent overnight by immersing the bobbin in running hot water (65° C.). It was then drained of surplus water and dried continuously under constant length conditions by winding four turns onto a 6 inch hot roll/separator roll system at 140° C. rotating at 15 ft./minute peripheral velocity. From the take-off end of the hot-roll the yarn was drawn 5.25 times onto a capstan/separator roll system and collected on a friction-driven metal bobbin. The drawn yarn was clear and lustrous, consisting of discrete filaments having a dumb-bell shaped cross-section, and had a denier of 134, a tenacity of 2.6 gms./denier and an extension at break of 7.1%.

A second sample of yarn was spun under similar conditions using a 6 foot bath travel. This sample was stretched 3 times between the first capstan and a second capstan/separator roll system before being collected on the friction-driven bobbin, being washed as above and dried at 140° C. and 28 ft./minute, and drawn 2.6 times. This yarn was also clear, lustrous and discrete, having a denier of 126, a tenacity of 2.8 gms./denier and 6.3% extension at break.

During the spinning, fresh liquor, containing 5% propylene carbonate in water at 90° C., was fed into the bath near the spinneret and overflow liquor was withdrawn at the far end of the bath at the rate of 45 cc.'s/minute. At the end of the spin, which lasted some 90 minutes, the liquor remaining in the bath was sampled near the spinneret and the water distilled off. The sample contained 9.7% propylene carbonate. This bath liquor (1200 cc's.) was mixed with the overflow liquor to form a mixture 5 litres in volume. It was cooled to 20° C. and mixed with 500 cc's. of benzene with vigorous stirring. The benzene fraction was allowed to separate out in a separating funnel as a top layer, and the bottom, aqueous layer was withdrawn and mixed with a further 500 cc's. of benzene at 20° C. The first benzene layer was withdrawn from the separating funnel into a distillation flask. The second benzene/propylene carbonate/water mixture was then placed in the funnel, and benzene allowed to separate out, the aqueous layer withdrawn and the second benzene layer added to the first layer in the distillation flask. The benzene was separated from the propylene carbonate by distillation under atmospheric pressure through a water-cooled side-condenser. Distillation was stopped when a vapour temperature of 130° C. was reached. The 210 gms. of liquid which remained in the distillation flask were treated with 10 gms. of activated carbon at the boil for five minutes, cooled to 60° C. and filtered using No. 1 grade filter paper. 148 gms. of propylene carbonate were obtained as a water-clear liquid.

This was used to prepare a second spinning solution in the following manner. 21 parts of the same graft interpolymer powder as used for the first spin were mixed with 142 parts of propylene carbonate and 47 parts of water at 65° C., slurried and heated to 100° C. to form a clear solution which was maintained at 100° C. for 45 minutes. This was spun in exactly the same manner as for the first yarn sample of the first spin, the liquor used for coagulation and bath refortification being the aqueous liquor recovered from the benzene extraction process, which contained 5.25% propylene carbonate by density measurement. The measured overflow rate was 47 cc's./minute. Spinning proceeded for 5 minutes and the yarn was after-processed as previously described, the draw ratio being 5 times and the drying feed rate 18 feet/minute. The drawn yarn was clear, lustrous, discrete and consisted of filaments having a dumb-bell shaped cross-section. It had a denier of 151 and a tenacity of 2.3 gms./denier at 9.2% extension at break.

290 cc's. of overflow liquor were collected containing 7.75% propylene carbonate according to density measurement.

Example 8

111 parts of a copolymer consisting of 7/93 vinyl pyridine/acrylonitrile were added to 900 parts of an 80/20 mixture of propylene carbonate/water while stirring at 65° C. The slurry was heated to 100° C. and the resulting solution maintained at 100° C. for 45 minutes. It had a setting temperature of 65°–70° C.

The above solution was extruded through a 60/.075 mm. viscose-type spinneret at 85° C. and 7.5 gms./minute into a coagulating bath containing 5% aqueous propylene carbonate at 90° C. The coagulated filaments were led through the bath a distance of 6 feet, being then wound several turns onto a capstan/separator roll system rotating at a peripheral speed of 20 feet/minute, and collected on a friction-driven metal bobbin. The yarn was washed substantially free from solvent by immersion overnight in running hot water (60° C.), drained, then dried and drawn 7 times continuously on a hot roll/separator roll system at 170° C. The drawn yarn had a denier of 169, and a tenacity of 2.5 gms./denier at 6.1% extension.

During the above spinning operation, the coagulating bath liquor was refortified continuously by introducing aqueous liquor containing 5% propylene carbonate at 90° C. near the spinneret and withdrawing overflow liquor at the far end of the bath at the rate of 45 ccs./minute. In this manner 5.5 kilograms of overflow liquor were collected in 125 minutes. To this liquor was added 0.8 kilogram of liquor remaining in the bath to give a mixture containing approximately 11% propylene carbonate, by density measurement. This was cooled to room temperature (23° C.) and mixed with 620 ccs. of benzene to assist the separation of the propylene carbonate. The benzene layer was separated from the aqueous layer in a separating funnel and the aqueous layer treated with a further 620 ccs. of benzene. In all, four such benzene extractions were carried out. The benzene fractions were then placed together in a distillation flask and heated to 130° C. All the benzene present, together with some water, was thereby removed, leaving propylene carbonate in the flask. This was treated at the boil (235° C.) for 5 minutes with 10 gms. activated carbon to give a water-clear liquid after filtration through a No. 1 grade filter paper. The propylene carbonate thus obtained amounted to 417 gms.

The aqueous layer remaining after benzene extraction was found, by density determination, to contain 5% propylene carbonate and it was therefore used in a second spinning trial as the coagulation medium, in the following manner.

61.5 gms. of the above vinyl pyridine/acrylonitrile copolymer were mixed with a mixture consisting of 100 gms. of fresh water and 400 gms. of the propylene carbonate recovered as described above. Identical solution-making, spinning and after-processing conditions were employed, except for a slightly higher liquor overflow rate of 50 ccs./minute. The drawn yarn had a denier of 105 and a tenacity of 2.8 gms./denier at 7% extension. The propylene carbonate concentration of the overflow liquor was 7.5%.

Both of the drawn yarns were dumb-bell shape in filament cross-section, they were clear and lustrous, discrete and suitable for textile purposes.

From the foregoing examples it can be seen that a considerable portion of propylene carbonate can be replaced by water without in any way impairing the efficiency of its solvent action. The proportion of propylene carbonate to polymer is in this way considerably reduced, leading to more economical spinning.

Polyacrylonitrile and grafted acrylonitrile polymers do not dissolve completely in 100% propylene carbonate even at temperatures around 150° C. such compositions are therefore not suitable for spinning into fibres. On the other hand solutions of the same polymers in a propylene carbonate/water mixture precipitate at considerably lower temperatures, i. e. below 85° C., thereby allowing for spinning at lower temperatures with the consequent reduction in heat degradation of the polymer and giving yarn of better colour.

Using acrylonitrile co-polymers as opposed to the homo-polymer, it is possible to spin yarns from propylene carbonate alone as the precipitation temperatures are lower.

An advantage which results from the use of propylene carbonate/water mixtures arises from the fact that when the polymer is made it need not be carefully dried before dissolving in the solvent, provided that the amount of water present in the polymer is allowed for when making the solution. As acrylonitrile and grafted acrylonitrile polymers can be made most easily by polymerising in an aqueous medium the washing of the polymer can be considerably reduced and furthermore, it need not be dried. The elimination of the drying step prevents the formation of hard, horny, difficultly soluble crumbs, which tend to form during drying, and exposure of the polymer to high temperatures at this stage, leading to discolouration is avoided. The undried product is easily dispersed in the solvent after only a simple sieving operation and no grinding is necessary. Just as the polymer can be used while still wet, so also can the propylene carbonate. In making up the original solution it is not necessary to use anhydrous propylene carbonate as long as the water content is known. For the spinning of fibres water coagulating-baths are used and gradually their propylene carbonate content increases. Small amounts of propylene glycol also appear as a product of hydrolysis of the propylene carbonate but this in no way affects the efficiency of the process. The propylene carbonate can be recovered from this coagulating bath, and again it is not necessary to dry the propylene carbonate carefully before it can be re-used.

By using the process of this invention it is not only possible to recover the propylene carbonate for re-use as a solvent but it is also possible to control the propylene carbonate concentration in the coagulating bath and prevent it becoming too high. One simple method of operating a continuous process is to cause the liquid in the coagulating bath to flow slowly towards the spinneret so that the more concentrated propylene carbonate mixture can eventually be withdrawn from the spinneret end of the bath and cooled. The propylene carbonate can then be recovered as hereinbefore described and used for making spinning solution and the remaining liquid passed back to the end of the bath from which the fibre emerges.

When making solutions of an acrylonitrile or grafted acrylonitrile polymer e. g. for use in spinning artificial fibres it is common practice to form a slurry of the polymer in the cold solvent and then to heat to obtain a clear solution. Using the compositions of our invention we have found that the polymer powder can be first wetted out with a part of the water and added to the remainder of the solvent mixture while the latter is hot.

We have found that stabilizers for the polymer and/or propylene carbonate, pigments, delustrants and other ancillary ingredients, as well as other liquids, particularly propylene glycol, may advantageously be present in the solution.

What we claim is:

1. A composition comprising an acrylonitrile polymer containing a major amount of acrylonitrile, propylene carbonate and water, wherein the weight of propylene carbonate is greater than that of the water and the amount of water is between about 14% and 40% by weight of the total amount of propylene carbonate and water.

2. A composition according to claim 1 wherein said acrylonitrile polymer is a grafted acrylonitrile polymer, said grated acrylonitrile polymer being obtained by polymerizing from about 85 to 100 parts by weight of acrylonitrile with from 0 to 15 parts by weight of at least one other monomeric vinyl compound in the presence of a polymer which is water soluble, has a molecular weight greater than 1000, and is present in an amount between 5 and 40% by weight of the grafted polymer.

3. A composition according to claim 1 wherein the acrylonitrile polymer is a copolymer containing a minor amount of at least one other vinyl polymer.

4. A composition according to claim 1 wherein the acrylonitrile polymer is made into a solution by first mixing with water and then dissolving in hot propylene carbonate.

5. A composition according to claim 4, wherein the solution is homogenised by heating for at least half-an-hour, at a temperature of 95–100° C. while stirring.

6. A process for spinning filaments and yarns of an acrylonitrile polymer, wherein a solution according to claim 1 is extruded into a coagulating bath.

7. A process according to claim 6, wherein water is the major constituent of the coagulating bath.

8. A process according to claim 7, including the step of recovering at least some of the propylene carbonate which accumulates in the coagulating bath by cooling to 0° C., so that the propylene carbonate separates out.

9. A process according to claim 7, including the step of recovering at least some of the propylene carbonate which accumulates in the coagulating bath by cooling to at least 25° C. and adding benzene, so propylene carbonate separates out.

References Cited in the file of this patent

UNITED STATES PATENTS 2,601,253    Bruson _____ June 24, 1952